Nov. 20, 1956  S. V. COLLINS  2,770,950
SUBMARINE CABLE INSTALLATION
Filed June 5, 1953  3 Sheets-Sheet 2
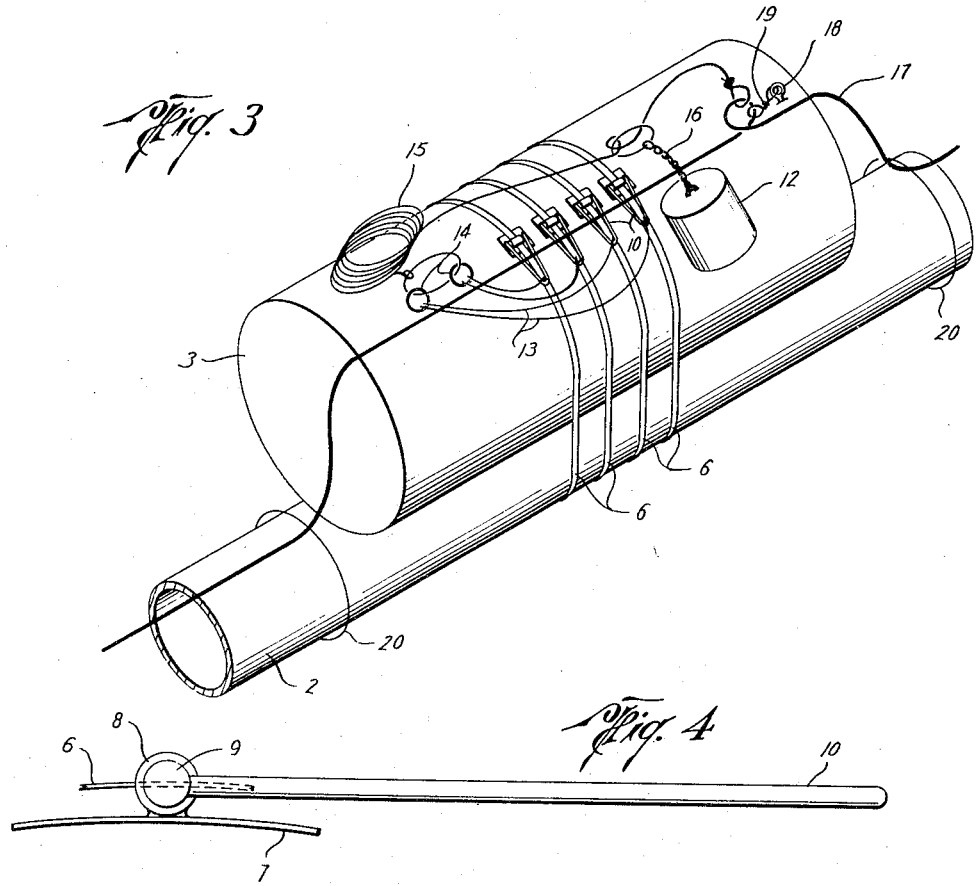
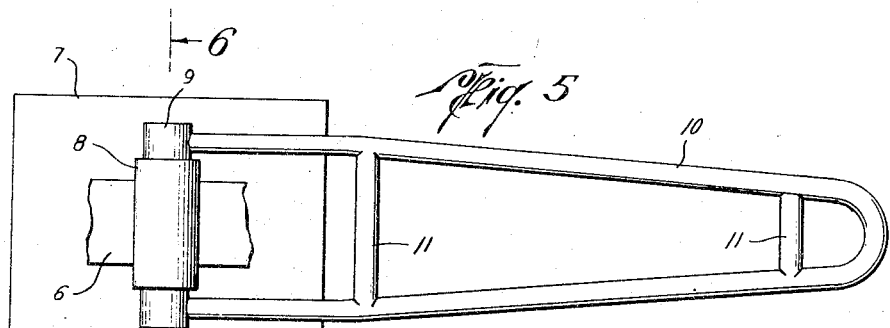
Samuel V. Collins
INVENTOR.
BY Geo. C. Helmig
+ Wm. E. Ford
ATTORNEYS Nov. 20, 1956  S. V. COLLINS  2,770,950
SUBMARINE CABLE INSTALLATION
Filed June 5, 1953  3 Sheets-Sheet 3
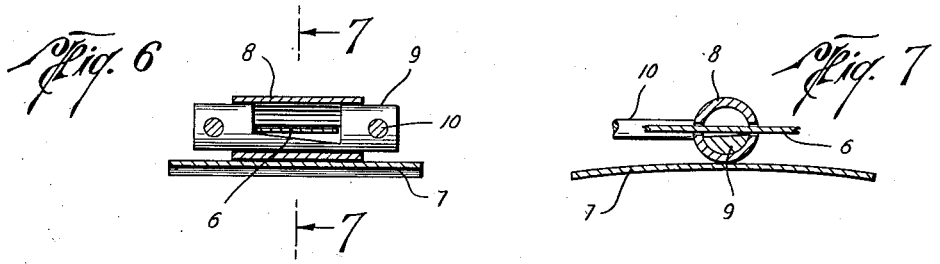
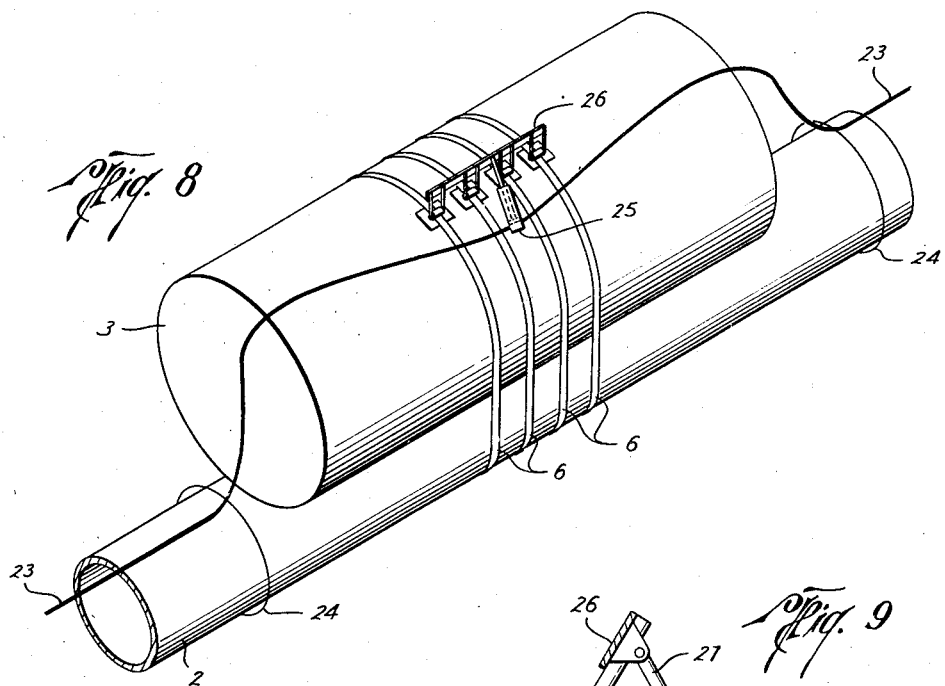
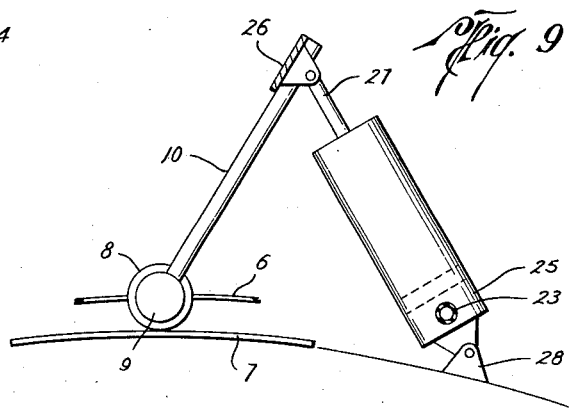
Samuel V. Collins
INVENTOR.
BY Geo. C. Helmig
+ Wm. E. Ford
ATTORNEYS

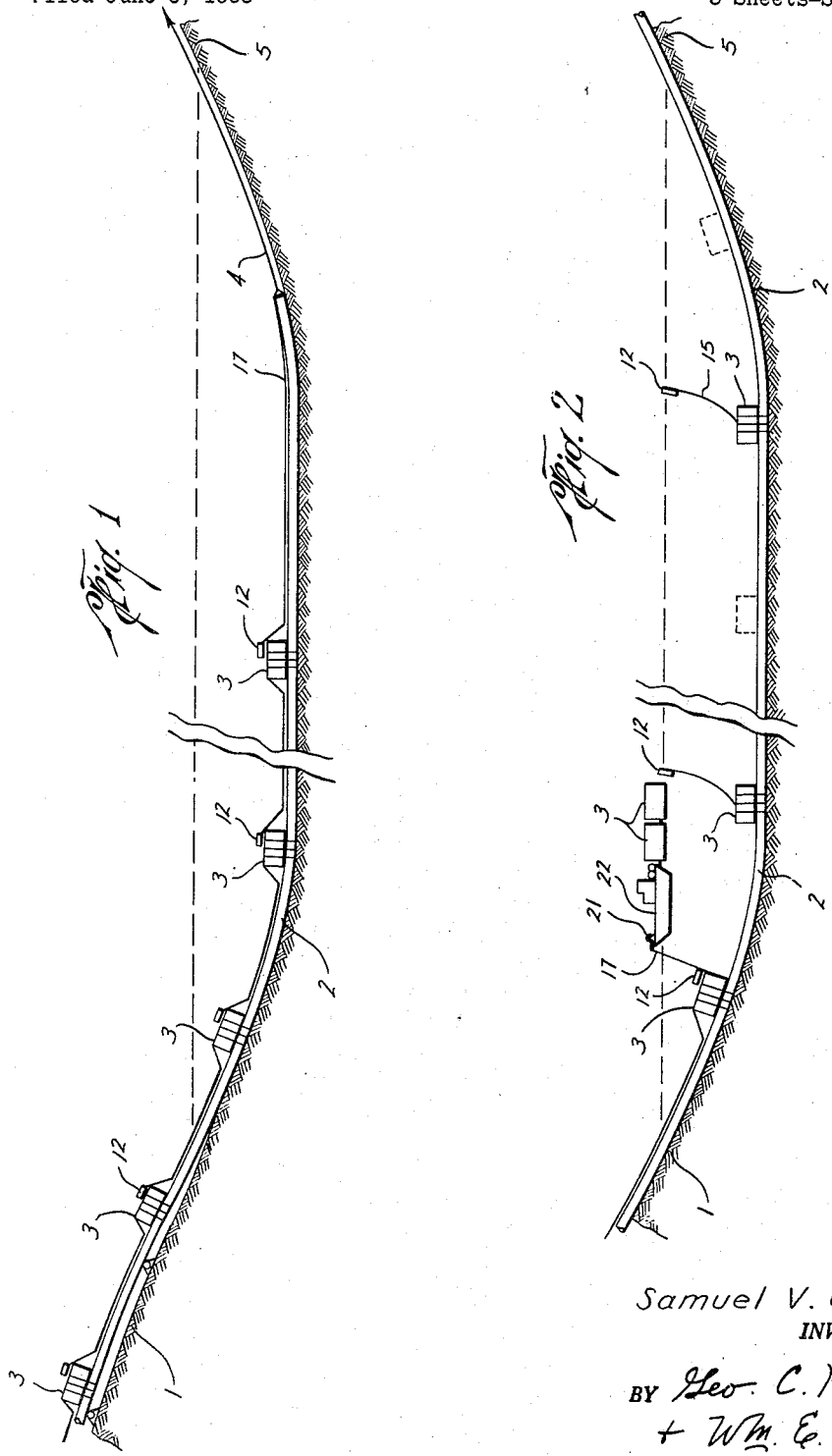

United States Patent Office 2,770,950
Patented Nov. 20, 1956

2,770,950

SUBMARINE CABLE INSTALLATION

Samuel V. Collins, Victoria, Tex.

Application June 5, 1953, Serial No. 359,871

11 Claims. (Cl. 61—72)

This invention relates to an improvement in laying submarine pipeline, cable or the like and the application is a continuation in part of application Serial No. 240,762, filed August 7, 1951, and of application Serial No. 322,720, filed November 26, 1952; which have now become Patents No. 2,731,800 dated January 24, 1956 and No. 2,735,270 dated February 21, 1956, respectively.

With reference to a fluid transmission conduit to extend for a considerable distance under a wide body of water, the conduit is usually made up of sections joined end to end above the surface and then floated to the desired location and allowed to sink toward the floor of the body of water and often into a preformed trench in the river bed or sea floor. For installation in waters carrying heavy traffic which can not be interfered with, it is proposed to employ pontoons to temporarily suspend the conduit below the surface a distance greater than the range required by vessels using the waters and the submerged suspension will continue as the conduit is fed into the water and maneuvered into final location. When the completed conduit is ready to be lowered the pontoons can then be quickly released without having tied up traffic.

Among the objects of the present invention is the provision of installation equipment which can be securely but releasably fastened to a submarine line as it is paid out into the water and which will partially support the assembly on the bed of a river or bay, with all parts tied down below a depth accommodating vessels plying the waters, and wherein the releasable fastenings will be controlled from above the surface to effect release at the desired or appointed time. As release occurs the submarine line settles by its weight and the suspension pontoons rise to the surface to be retrieved quickly by crews in work boats and the entire procedure is accomplished with little or no delay to regular and normal traffic. The arrangement is particularly useful for crossing heavily traveled navigable river channels with fluid transmission conduits but it will have utility in laying other types of submarine lines and in all bodies of water presenting problems of traversing a wide gap.

A further object of the invention is to select pontoons of such capacity in relation to submarine cable load as to carry the greatest portion of the cable weight so that cable contact with the floor of the body of water is sufficient to eliminate the need for locating tension guy lines or other guide devices to prevent shifting with stream currents, tides and the like, but yet not so great that friction drag interferes with pulling long lengths underneath the water economically with readily available equipment or introduces the likelihood of high tensions to break the pulling line or the submarine conduit itself.

The invention will be better understood upon reference to the accompanying drawings wherein Figs. 1 and 2 are cross sectional views of a river bed showing a submarine line in stages respectively of partial crossing and of readiness for pontoon release; Fig. 3 is a perspective view of a releasably fastened pontoon and conduit section assembly and the release actuating parts prior to launching; Figs. 4 and 5 are an end elevation and a top plan view, respectively, of a strap severing knife, Fig. 6 is a detail section on line 6—6 of Fig. 5; Fig. 7 is a transverse section on line 7—7 of Fig. 6; Fig. 8 is a perspective view of a pontoon and conduit assembly and illustrates a pressure fluid operated knife for cutting the fastening straps, and Fig. 9 is an elevation showing on a larger scale the knife operating motor mechanism of Fig. 8.

After a site has been selected for a pipe line crossing, a preliminary step may be the trenching of a groove in the river floor, followed by the erection on shore of a track for launching dollies extending to and below the water's edge. From a bank of conduit sections lift cranes will be employed to place conduit sections in end to end relation for coupling as by welding. After a corrosion protective coating is applied, the conduit will be secured to a pontoon of proper size and the forward end of the conduit will have a cap applied for attachment of a drag or tow line. The tow line may extend to a winch on the opposite shore or it may be secured to a tug boat for pulling the conduit and pontoon assembly into the water in steps as additional sections are coupled. The size and spacing of the pontoons will be such that the conduit is suspended below the water surface, preferably close to the river bed and even in slight contact with it, since essentially the purpose is accomplished when conduit weight is borne or lifted just enough to eliminate or minimize frictional drag.

On reference to Fig. 1 it will be seen that to the left is indicated the shore 1 where there is located the assembly station including the launching ways for the conduit 2 carrying the pontoon assembly 3. Also indicated is a tow line 4 at the front end of the conduit extending upwardly above the water level to the opposite shore 5.

The pontoon 3 preferably consists of a large hollow cylindrical tank of sheet metal and it is secured to the conduit 2 by a suitable quick detachable connection. The connection illustrated comprises a number of steel banding straps 6 which encircle the conduit and pontoon and whose ends are drawn up tight and secured in the conventional manner. At the top of the tank 3 each strap passes through a severing knife, the detail of which is to be seen in Figs. 4 to 7 inclusive.

A flat base plate 7 is arranged to bear against the top wall of the pontoon 3 and on its upper side it carries a tube or sleeve 8, in which is rotatably mounted a center pin 9. At its opposite ends the center pin projects beyond the sleeve 8 and is transversely apertured to receive securely the ends of a U shape rod 10 which constitutes a knife operating lever. One or more transverse struts 11 may be welded to the legs of the lever 10 for imparting strength thereto. As seen in Figs. 6 and 7 the rotary pin 9 contains a central notch of a width to receive the strap 6 and the sleeve 8 contains diametrically opposite slots through which the strap 6 is threaded. The bottom of the strap receiving notch of the pin 9 is inclined in the axial direction for a concentration of force across the face of the strap when the lever 10 is swung upwardly to shear the strap 6 between co-operating edges of the pin 9 and slotted sleeve 8.

The free end of the lever 10 is connected by an actuating pull line to a marker and guide buoy 12 and the line will be of sufficient length to allow the buoy to reach the surface. Initially the buoy will be tied down so as to be out of the way during the time the conduit is being fed across the stream. In the arrangement shown in Fig. 3 the pull line includes flexible ropes 13 connecting the free ends of the knife operating levers 10 to a group of rings 14 to which one end of a cable coil 15 is secured. The opposite end of the cable after being looped and knotted to a buoy anchor chain 16, is secured to a jerk line or cable 17. The adjoining parts of the pull and jerk cables 15 and 17 are tied down to an anchor eye 18 by a light rope or string 19 which is of sufficient strength to retain the parts in the absence of any appreciable breaking force applied thereto. The jerk line 17 is additionally tied at intervals along the length of the conduit 2 by breakable cords or light strings 20. The forward end of the jerk cable 17 will be fastened to the forward cap or tow nose so that after the pipe line has spanned the entire distance between the points to be connected and has been maneuvered into final location, the cable can be used in the operation of releasing the spaced pontoons. Thus the cable can be fastened to a wind-up roll or winch 21 on a work boat 22, and as it is taken in, it will exert a jerk or pull successively on the breakable cords 19 and 20 whereupon the guide buoy 12 will surface as each pontoon position is reached. Each buoy 12 as it comes to the surface may be retrieved and the pull line 15 can be pulled upwardly by the working crew to unfasten the bands for the release of the pontoons 3.

Optionally, selected pontoons may be released in alternate or other relations. For the purpose of illustration, Fig. 2 shows the work boat in condition to release the final buoy 12 after having retrieved a few of the buoys and with two pontoons in tow from original positions shown by dotted lines. Other buoys still floating on the surface are ready to be picked up whenever it is desired to release the remaining pontoons.

In place of a mechanical pull line as previously described, it may be feasible for certain installations to actuate the band release devices by electric, hydraulic or gas lines and one such example is illustrated in Figs. 8 and 9. In this case a compressed air hose 23 extends along the length of the pipe line from a source of air under pressure above the surface and under control of suitable valving. The hose is secured at intervals by breakable cords 24 to the conduit and communicates with a cylinder of a piston motor 25 for motor response to pneumatic force transmitted thereto in actuating the band release knives. One such cylinder may be associated with each knife but conveniently the operating handles of the several knives are to be secured to a cross bar 26 arranged for pivotal connection with the end of the piston rod 27. The piston cylinder in turn is pivotally mounted to a support bracket 28 welded to the pontoon. When air under pressure is fed to the cylinder 25, the piston rod 27 will be projected to swing the knife actuating levers and cut the bands which allows the pontoons to rise and the conduit to sink. The installation of restriction or metering orifices between successive piston cylinders can be employed for controlling the release of successive pontoons at governed intervals. Thus, by manipulation of the main control valve, a shot of air can be delivered to the first air motor for its sole actuation before sufficient pressure can build up beyond the restriction to the second air motor. A shut off and a relief of pressure will stay further release of pontoons until pressure is again applied, and the same control operation can be repeated for successive individual pontoon release. However, in most instances, the concurrent release of all pontoons will be satisfactory. Sufficient lengths of hose between successive pontoons will be required to accommodate selective surfacing of pontoons.

From the above description, it will be apparent that there has been provided an improved method and easy to use equipment whereby continuous pipe lines, telephone conduits and other types of cables may be quickly laid under a body of water with a minimum of interference from or disruption to marine traffic.

What is claimed is:

1. The method of laying a continuous length of conduit on the floor of a body of water, comprising fastening by releasable connections to the conduit in selected longitudinal spacing, a series of pontoons of size and number in relation to conduit weight to suspend the conduit below the water surface adjacent the floor of the body of water, joining the releasable connections each to a guide buoy by a length of line at least as long as the distance of pontoon submergence, tying the buoys for submergence with the conduit by releasable hold-down connections, joining all the last mentioned connections to a connection releasing jerk line extending along the length of the conduit, launching and maneuvering the conduit in the body of water into its desired resting place on the floor, then exerting tension on the jerk line to break in succession the guide buoy hold down connections and finally exerting tension on the connecting line of each surfaced guide buoy to release the first mentioned connections and unfasten the submerged pontoons for dropping the conduit.

2. The method of laying below the surface of a body of water, a conduit built up by joining in end to end succession above the surface a series of conduit sections and progressively launched as sections are added and which conduit at the time of launching has secured thereto, by pull cable operated, releasable connections a series of pontoons to suspend the conduit fully submerged a predetermined distance below the surface, said method including tying down against surfacing a guide buoy by a releasable tie-down at each pontoon and which buoys are joined to the releasable connections by releasing pull cables of lengths at least as great as the distance of conduit submergence, running a jerk line to each buoy tie down in succession and after the completed conduit is maneuvered into final position, pulling on the jerk line for individually releasing buoy tie downs to enable each buoy to surface and then pulling on each buoy joined pull cable for operating the pontoon release connections and thereby progressively free the conduit to seek its final position.

3. The method of placing a submarine line, including securing a series of line suspending pontoons to the line, each by a releasable fastening, tying down against surfacing by a releasable tie-down at each releasable fastening, a guide buoy on a force transmitting connection through which the fastening can be released, joining each tie down to an untying cable extending along said line, maneuvering the pontoon suspended line into desired position, then triggering said cable to release said tiedown and free the buoys for surfacing and thereafter locating surfaced buoys and applying force through each connection for releasing pontoon fastenings.

4. The method of laying a submarine line, including assembling line sections end to end above the surface, fastening the line as its sections are progressively assembled, by releasable connections to a series of pontoons of such buoyancy in relation to the weight of the line as to suspend the line submerged in drag contact with the floor of a body of water, extending between the several connections an actuating release line for submergence with the pontoons, progressively launching the line during its sectional assembly and maneuvering the pontoon suspended line into the desired final rest position on the floor and after all line sections are assembled and at final rest position, applying an actuating force by said actuating line in the operation of releasing said connections.

5. In a method of laying a submarine line, releasably fastening a series of pontoons by controlled force responsive releasable connections to the line prior to its submergence in a body of water and which pontoons are arranged to buoyantly suspend the line in bearing contact with the floor, tying down by a breakable tie to the line and pontoon fastened assembly for submergence as a unit therewith, a force transmitting member which extends along the length of the line and is operatively joined to said releasable connections, launching and maneuvering the assembly to desired position and thereafter transmitting force through said member and thereby breaking said tie and releasing said connection.

6. Submarine line laying equipment, including pontoons to float the line to be laid into selected position, pontoon securing severable straps joining the pontoons to the line, strap cutting knives positioned for operation to sever said straps, pressure fluid responsive motors operatively connected to the strap cutting knives for the actuation thereof, a pressure fluid conduit leading to the several motors for delivering operating fluid thereto and breakable cords tying said conduit to the line as a temporary assembly therewith.

7. Submarine line laying equipment including a series of line suspending pontoons, whose combined buoyancy is slightly less than the displaced weight of the line, banding straps securing the pontoons to the line for floating the same to location, strap severing knives having operating lines to reach to the surface, a guide buoy on the surfacing end of each line, releasable tie downs initially holding said buoys to the pontoons against surfacing and a tie down releasing cable extending to the surface and operable at will to release said tie downs.

8. Means for floating a submerged line under the surface of a body of water and releasing the line over a selected location including releasable fastenings to secure a series of line weight suspending pontoons to the line, force responsive means co-operating with each fastening and operable to effect release thereof, a series of force transmitting cables, one for each pontoon fastening and each having one end joined to a force responsive means, a guide buoy joined at the opposite end of each cable to bring the same to the surface for its operation in releasing the fastening, a tie connection initially holding the buoy submerged and a jerk line extending from the surface and being joined to all tie connections to disconnect the same.

9. Equipment for installing a submarine conduit which is assembled above the surface of a body of water and is then submerged and moved to location, including a series of pontoons for releasable securement assembly to the conduit and whose buoyancy is such as to suspend the major portion of the load when the assembly is submerged and partially supported on the floor of a body of water, band straps securing the pontoons to the conduit, severing knives positioned one at each strap for operation to sever the strap, a force responsive means operably connected with the strap severing knives for their strap severing operation upon actuation of the force responsive means, and a force transmitting line common to and communicating in succession with the respective force responsive means and extending longitudinally along the conduit from a point above the surface.

10. The method of installing a submarine conduit on the floor of a body of water, including fabricating a conduit assembly above the surface, banding to the conduit by severable straps a series of pontoons at longitudinally spaced positions along the conduit and whose buoyancy is selected in relation to size and weight of the conduit, for suspending the same in submerged contact with the floor of the body of water, mounting a band severing knife and a knife actuating force responsive device at each strap and connecting all the force responsive devices to a common force transmitting line extending along the length of the conduit, launching and maneuvering the pontoon suspended conduit assembly in the body of water to the final resting place of the conduit, and then transmitting force through said line to sever the banding straps.

11. The method of laying a submarine conduit, including applying fastenings to join the conduit with a series of pontoons whose combined buoyancy in relation to the size and weight of the conduit will suspend the conduit partially and sufficiently to enable its movement on the floor of a body of water, incorporating in each fastening a fluid pressure responsive fastening severing device, connecting to the conduit by breakable ties a fluid pressure supply conductor communicating with each of the fluid pressure responsive devices, positioning the conduit and pontoon assembly on the floor and thereupon supplying fluid under pressure through said conductor to actuate said devices and thereby sever the fastenings between the pontoons and the conduit and breaking said ties between the conduit and the conductor.

References Cited in the file of this patent

UNITED STATES PATENTS

| | | |
|---|---|---|
| 375,464 | Thacher | Dec. 27, 1887 |
| 612,485 | Conover | Oct. 18, 1898 |
| 650,134 | Phillips | May 22, 1900 |
| 1,363,115 | Helfrich | Dec. 21, 1920 |
| 1,873,563 | Euth | Aug. 23, 1932 |
| 1,887,460 | Nelson | Nov. 8, 1932 |
| 2,100,231 | Armstrong | Nov. 23, 1937 |
| 2,391,059 | Macfarren | Dec. 18, 1945 |
| 2,731,800 | Collins | Jan. 24, 1956 |